(12) United States Patent
Yin et al.

(10) Patent No.: US 9,341,742 B2
(45) Date of Patent: May 17, 2016

(54) MAGNETIC ASSEMBLY OF NONMAGNETIC PARTICLES INTO PHOTONIC CRYSTAL STRUCTURES

(75) Inventors: Yadong Yin, Riverside, CA (US); Le He, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 256 days.

(21) Appl. No.: 13/879,234

(22) PCT Filed: Oct. 12, 2011

(86) PCT No.: PCT/US2011/055913
§ 371 (c)(1),
(2), (4) Date: Aug. 8, 2013

(87) PCT Pub. No.: WO2012/051258
PCT Pub. Date: Apr. 19, 2012

(65) Prior Publication Data
US 2013/0313492 A1 Nov. 28, 2013

Related U.S. Application Data

(60) Provisional application No. 61/392,254, filed on Oct. 12, 2010.

(51) Int. Cl.
| | | |
|---|---|---|
| *G02B 5/23* | (2006.01) | |
| *G02B 1/00* | (2006.01) | |
| *B82Y 20/00* | (2011.01) | |
| *G02B 6/122* | (2006.01) | |
| *B29D 11/00* | (2006.01) | |
| *G02B 1/12* | (2006.01) | |

(52) U.S. Cl.
CPC .............. *G02B 1/005* (2013.01); *B82Y 20/00* (2013.01); *G02B 6/1225* (2013.01)

(58) Field of Classification Search
USPC ........ 252/62.56, 586; 977/811, 952; 264/1.36
See application file for complete search history.

(56) References Cited

U.S. PATENT DOCUMENTS

| | | | |
|---|---|---|---|
| 4,846,988 A * | 7/1989 | Skjeltorp | ................... 252/62.52 |
| 6,797,057 B1 | 9/2004 | Amos et al. | |
| 6,939,362 B2 | 9/2005 | Boyle et al. | |
| 7,045,195 B2 | 5/2006 | Ozin et al. | |
| 7,247,349 B2 | 7/2007 | Ozin et al. | |
| 7,758,919 B2 | 7/2010 | Ozin et al. | |
| 2002/0045030 A1 | 4/2002 | Ozin et al. | |
| 2003/0100917 A1 | 5/2003 | Boyle et al. | |
| 2004/0053009 A1 | 3/2004 | Ozin et al. | |
| 2005/0075663 A1 | 4/2005 | Boyle et al. | |

(Continued)

OTHER PUBLICATIONS

B.J. de Gans, C. Blom, A. P. Philipse and J. Mellema, Linear viscoelasticity of an inverse ferrofluid, Physical Review E vol. 60, No. 4, 4518-4527, © 1999 The American Physical Society.*

(Continued)

*Primary Examiner* — Bijan Ahvazi
(74) *Attorney, Agent, or Firm* — Buchanan Ingesoll & Rooney PC

(57) ABSTRACT

A method of forming colloidal photonic crystal structures, which diffract light to create color, which includes dispersing solid particles within a magnetic liquid media, and magnetically organizing the solid particles within the magnetic liquid media into colloidal photonic crystal structures.

23 Claims, 6 Drawing Sheets

(56) References Cited

U.S. PATENT DOCUMENTS

2007/0196571 A1    8/2007    Ozin et al.
2010/0224823 A1    9/2010    Yin et al.

OTHER PUBLICATIONS

Gang Xie, Qiuyu Zhang, Zhengping Luo, Min Wu, Tiehu Li, Preparation and Characterization of Monodisperse Magnetic Poly(styrene butyl acrylate methacrylic acid) Microspheres in the Presence of a Polar Solvent, Journal of Applied Polymer Science, vol. 87, 1733-1738, 2003, © 2003 Wiley Periodicals, Inc.*
Jozef Černák, Aggregation dynamics of nonmagnetic particles in a ferrofluid, Physical Review E 70, 031504-1-031504-8, 2004. ©2004 The American Physical Society.*
Arne T. Skjeltorp, Condensation and ordering of colloidal spheres dispersed in a ferrofluid, Physica A 213 (1 995) 30-40, Elsevier Science B.V.*
International Search Report (PCT/ISA/210) issued on Apr. 30, 2012, by the U.S. Patent and Trademark Office as the International Searching Authority for International Application No. PCT/US2011/055913.
Wanke, M., et al., "Laser Rapid Prototyping of Photonic Band-Gap Microstructures", Science, vol. 275, No. 5304, pp. 1284-1286, Feb. 28, 1997.
Lin. S., et al., "A Three-Dimensional Photonic Crystal Operating at Infrared Wavelengths", Nature, vol. 394, Issue 6690, pp. 251-253, Jul. 16, 1998.
Fleming, J. G., et al., "Three-Dimensional Photonic Crystal with a Stop Band from 1.35 to 1.95 µm", Optics Letters, vol. 24, No. 1, pp. 49-51, 1999.
Masuda, H., et al., "Photonic Crystal Using Anodic Porous Alumina", Japanese Journal of Applied Physics, vol. 38, Part 2, No. 12A, pp. L1403-L1405, Dec. 1999.
Campbell, M., et al., "Fabrication of Photonic Crystals for the Visible Spectrum by Holographic Lithography", Nature, vol. 404, No. 6773, pp. 53-56, Mar. 2, 2000.
Noda, S., et al., "Full Three-Dimensional Photonic Bandgap Crystals at Near-Infrared Wavelengths", Science, vol. 289, No. 5479, pp. 604-606, Jul. 28, 2000.
Birner, A., et al., "Silicon-Based Photonic Crystals", Advanced Materials, vol. 13, No. 6, pp. 377-388, 2001.
Xia, Y., et al., "Monodispersed Colloidal Spheres: Old Materials with New Applications", Advanced Materials, vol. 12, No. 10, pp. 693-713, 2000.
Braun, P., et al., "Epitaxial Growth of High Dielectric Contrast Three-Dimensional Photonic Crystals", Advanced Materials, vol. 13, No. 10, pp. 721-724, May 17, 2001.
Lee, S., et al., "High-Speed Fabrication of Patterned Colloidal Photonic Structures in Centrifugal Microfluidic Chips", The Royal Society of Chemistry, Lab Chip, vol. 6, Issue 9, pp. 1171-1177, Jun. 2006.
Lu, Y., et al., "Growth of Large Crystals of Monodispersed Spherical Colloids in Fluidic Cells Fabricated Using Non-Photolithographic Methods", Langmuir, vol. 17, No. 20, pp. 6344-6350, 2001.
Holgado, M., et al., "Electrophoretic Deposition to Control Artificial Opal Growth", Langmuir, vol. 15, No. 14, pp. 4701-4704, 1999.
Jiang, P., et al., "Single-Crystal Colloidal Multilayers of Controlled Thickness", Chemistry of Materials, vol. 11, No. 8, pp. 2132-2140, 1999.
Velev, O., et al., "A Class of Microstructured Particles through Colloidal Crystallization", Science, vol. 287, No. 5461, pp. 2240-2243, Mar. 24, 2000.
Fudouzi, H., "Colloidal Crystals with Tunable Colors and Their Use as Photonic Papers", Langmuir, vol. 19, No. 23 pp. 9653-9660, Aug. 2003.
Arsenault, A., et al., "From Colour Fingerprinting to the Control of Photoluminescence in Elastic Photonic Crystals", Nature Materials, vol. 5, Issue 3, pp. 179-184, Mar. 2006.
Arsenault, A., et al., "Photonic-Crystal Full-Colour Displays", Nature Photonics, vol. 1, No. 8, pp. 468-472, Aug. 2007.
Asher, S., et al., "Self-Assembly Motif for Creating Submicron Periodic Materials. Polymerized Crystalline Colloidal Arrays", Journal of the American Chemical Society, vol. 116, No. 11, pp. 4997-4998, 1994.
Pan, G., et al., "Nanosecond Switchable Polymerized Crystalline Colloidal Array Bragg Diffracting Materials", Journal of the American Chemical Society, vol. 120, No. 26, pp. 6525-6530, 1998.
Reese, C., et al., "Synthesis of Highly Charged, Monodisperse Polystyrene Colloidal Particles for the Fabrication of Photonic Crystals", Journal of Colloid and Interface Science, vol. 232, Issue 1, pp. 76-80, Aug. 2000.
Ge, J., et al., "Assembly of Magnetically Tunable Photonic Crystals in Nonpolar Solvents", Journal of the American Chemical Society, vol. 131, No. 10, pp. 3484-3486, 2009.
Ge, J., et al., "Magnetically Responsive Colloidal Photonic Crystals", Journal of Materials Chemistry, The Royal Society of Chemistry, vol. 18, Issue 42, pp. 5041-5045, 2008.
Ge, J., et al., "Magnetically Tunable Colloidal Photonic Structures in Alkanol Solutions", Advanced Materials, vol. 20, Issue 18, pp. 3485-3491, Sep. 17, 2008.
Ge, J., et al., "Self-Assembly and Field-Responsive Optical Diffractions of Superparamagnetic Colloids", Langmuir, American Chemical Society, vol. 24, No. 7, pp. 3671-3680, Feb. 13, 2008.
Ge, J., et al., "Highly Tunable Superparamagnetic Colloidal Photonic Crystals", Angewandte Chemie, vol. 119, Issue 39, pp. 7572-7575, Oct. 1, 2007.
Xu, X., et al., "Synthesis and Utilization of Monodisperse Superparamagnetic Colloidal Particles for Magnetically Controllable Photonic Crystals", Chemistry of Materials, American Chemical Society, vol. 14, No. 3, pp. 1249-1256, 2002.
Xu, X., et al., "Mesoscopic Monodisperse Ferromagnetic Colloids Enable Magnetically Controlled Photonic Crystals", Journal of the American Chemical Society, vol. 124, No. 46, pp. 13864-13868, 2002.
Ge, J., et al., "Rewritable Photonic Paper with Hygroscopic Salt Solution as Ink", Advanced Materials, vol. 21, Issue 42, pp. 4259-4264, Nov. 13, 2009.
Ge, J., et al., "Magnetochromatic Microspheres: Rotating Photonic Crystals", Journal of the American Chemical Society, vol. 131, No. 43, pp. 15687-15694, 2009.
Skjeltorp, A., "One-and Two-Dimensional Crystallization of Magnetic Holes", Physical Review Letters, vol. 51, No. 25, pp. 2306-2311, Dec. 19, 1983.
Clausen, S., et al., "Braid Description of Collective Fluctuations in a Few-Body System", Physical Review E, vol. 58, No. 4, pp. 4229-4237, Oct. 1998.
Erb, R.M. et al., "Magnetic Assembly of Colloidal Superstructures with Multipole Symmetry", Nature, vol. 457, No. 7232, pp. 999-1002, Feb. 19, 2009.
Erb, R.M. et al., "Magnetic Field Induced Concentration Gradients in Magnetic Nanoparticle Suspensions: Theory and Experiment", Journal of Applied Physics, American Institute of Physics, vol. 103, No. 6, pp. 063916-1-063916-5, 2008.
Helgesen, G., et al., "Nanoparticle Induced Self-Assembly", Journal of Physics: Condensed Matter, vol. 20, No. 20, pp. 1-6, May 1, 2008.
Pieranski, P., et al. "Braids Plaited by Magnetic Holes", Physical Review Letters, vol. 77, No. 8, pp. 1620-1623, Aug. 19, 1996.
Ge, J., et al., "One—Step Synthesis of Highly Water—Soluble Magnetite Colloidal Nanocrystals", Chemistry—A European Journal, vol. 13, Issue 25, pp. 7153-7161, Aug. 27, 2007.
Qiu, D., et al., "Narrowly Distributed Surfactant—Free Polystyrene Latex with a Water—Soluble Comonomer", Macromolecular Chemistry and Physics, vol. 206, Issue 22, pp. 2233-2238, Nov. 14, 2005.
Islam, M. F., et al., "Field-Induced Structures in Miscible Ferrofluid Suspensions with and without Latex Spheres" Physical Review E, The American Physical Society, vol. 67, Issue 2, pp. 021402-1-021401-8, Feb. 14, 2003.

* cited by examiner a b

MAGNETIC ASSEMBLY OF NONMAGNETIC PARTICLES INTO PHOTONIC CRYSTAL STRUCTURES

CROSS-REFERENCE TO RELATED APPLICATION

This application is a 35 USC §371 national stage application of International Application No. PCT/US2011/055913 filed on Oct. 12, 2011, which claims the benefit under 35 USC 119(e) of U.S. Application No. 61/392,254 filed on Oct. 12, 2010, wherein the entire contents of each of the above applications are incorporated herein by reference.

FIELD OF THE INVENTION

The present invention relates to a method for magnetic assembly of nonmagnetic particles into photonic crystal structures, and more particularly to a method for magnetic assembly of nonmagnetic particles into photonic crystal structures by dispersing nonmagnetic particles within a magnetic liquid media, and magnetically organizing the nonmagnetic particles within the magnetic liquid media into colloidal photonic crystal structures.

BACKGROUND

The practical application of photonic crystals, especially those with band gaps located in the visible regime, has been limited by the low efficiency and high cost involved in the conventional lithographic fabrication techniques. The fabrication challenges have provided a major driving force for study of alternative approaches to photonic crystal preparation. Indeed, many self-assembly processes have been successfully developed in the past two decades to organize uniform colloidal objects into ordered structures that show photonic response in the visible spectrum. Typical self-assembly methods include those utilizing gravitational force, centrifugal force, hydrodynamic flow, electrophoretic deposition, capillary force, and electrostatic interaction to assemble colloidal crystals. However, there are still challenges that need to be addressed before the self-assembly approaches can be widely used for fabricating photonic materials in an efficient manner. A major problem is in the fabrication efficiency: the formation of high quality colloidal crystals over a large area usually takes hours to days or even months to complete. The low production efficiency makes many applications impractical.

Recently, it was discovered that nanostructured superparamagnetic magnetite ($Fe_3O_4$) particles can be conveniently assembled under the external magnetic field to instantly produce ordered one-dimensional (1D) photonic structures, as driven by the balanced interaction of the induced magnetic attraction and various repulsions among the magnetite particles. Since there are many more choices for nonmagnetic colloidal particles with uniform sizes and optimal refractive indices, it would be advantageous to extend the magnetic assembly strategy to nonmagnetic particles to allow their rapid assembly into large-area photonic crystals with high quality. Conventionally, magnetic assembly of nonmagnetic materials is achieved by modifying these building blocks with magnetic materials, which apparently limits the choices of materials and the applicability of the processes. Accordingly, it would be desirable to demonstrate the use of nanocrystal-based ferrofluids to direct the assembly of nonmagnetic colloidal particles into photonic crystal structures. The process is general, efficient, convenient, and scalable, thus represents a new and practical platform for the fabrication of colloidal crystal-based photonic devices.

SUMMARY

In accordance with an exemplary embodiment, the rapid formation of photonic crystal structures by assembly of uniform nonmagnetic colloidal particles in ferrofluids using external magnetic fields is described herein. Magnetic manipulation of nonmagnetic particles with size down to a few hundred nanometers, suitable building blocks for producing photonic crystals with band gaps located in visible regime, has been difficult due to their weak magnetic dipole moment. Increasing the dipole moment of magnetic holes has been limited by the instability of ferrofluids towards aggregation at high concentration or under strong magnetic field. In accordance with an exemplary embodiment, by taking advantage of the superior stability of highly surface-charged magnetite nanocrystal-based ferrofluids, one is able to successfully assemble nonmagnetic polymer beads with size of 185 nm into photonic crystal structures, from 1D chains to 3D assemblies as determined by the interplay of magnetic dipole force and packing force. In a strong magnetic field with large field gradient, three-dimensional (3D) photonic crystals with high reflectance (83%) in the visible range can be rapidly produced within several minutes, making this general strategy promising for fast creation of large-area photonic crystals using nonmagnetic particles as building blocks.

In accordance with an exemplary embodiment, a method of forming colloidal photonic crystal structures, which diffract light to create color comprises: dispersing solid particles within a magnetic liquid media; and magnetically organizing the solid particles within the magnetic liquid media into colloidal photonic crystal structures.

In accordance with an exemplary embodiment, the solid particles are non-magnetic, and the magnetic liquid media is a magnetic nanoparticle-based ferrofluid. The nanoparticle-based ferrofluid is prepared by dispersing magnetic nanoparticles of transition metal and metal oxides (such as $Fe_3O_4$, $\gamma$-$Fe_2O_3$, $Co_3O_4$, Ni, Co, Fe, etc.) nanoparticles in a liquid medium. The ferrofluid can be created in a polar solvent, or alternatively, a non-polar solvent.

In accordance with another exemplary embodiment, colloidal photonic crystal structures, which diffract light to create color, the structures comprise: a magnetic liquid media having solid particles dispersed therein; and magnetically organizing the solid particles within the magnetic liquid media into colloidal photonic crystal structures.

BRIEF DESCRIPTION OF THE DRAWINGS

The exemplary embodiments of the disclosed systems and methods can be better understood with reference to the following drawings and description. The components in the figures are not necessarily to scale, emphasis instead being placed upon illustrating the principles of exemplary embodiments of the disclosed system. Moreover, in the figures, like reference numerals designate corresponding parts through the different views.

Figure 1:
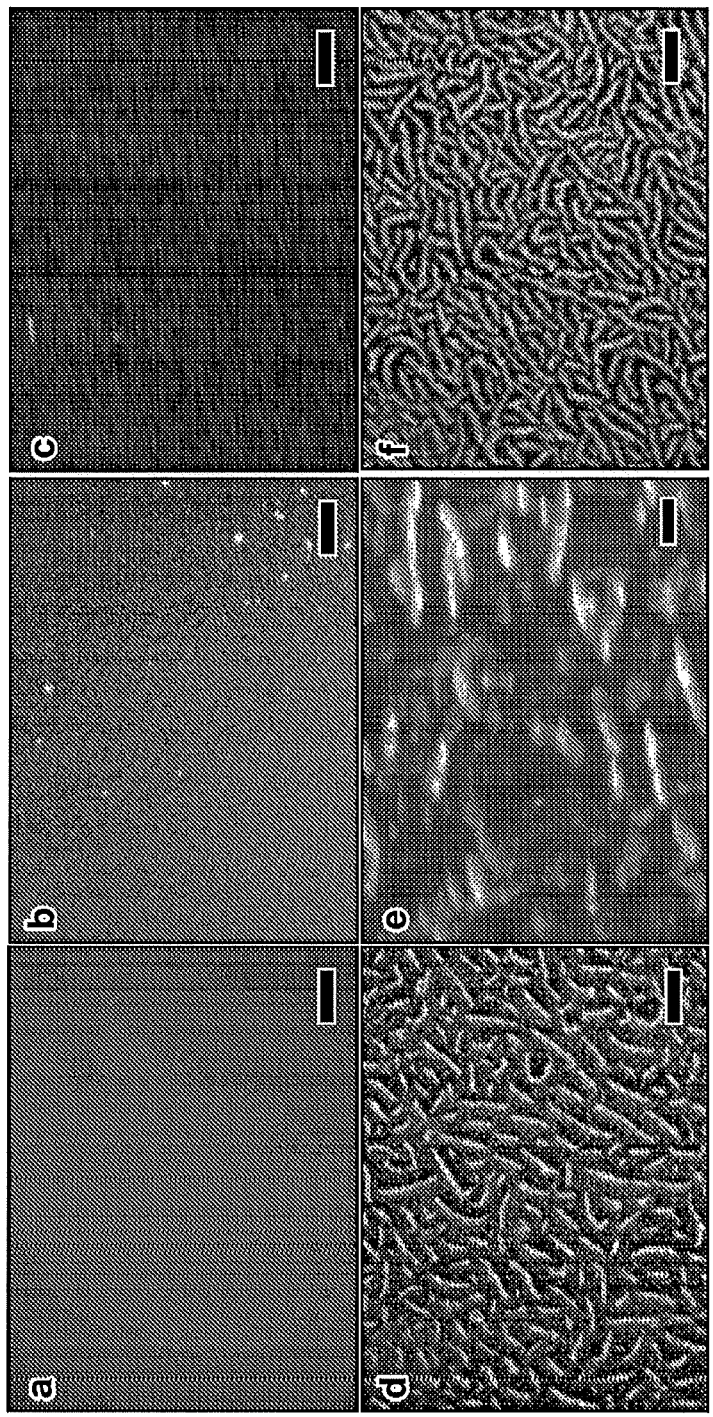
FIG. 1 are optical microscope images showing the assembly of 185-nm PS beads (volume fraction of 3%) dispersed in the ferrofluid (volume fraction of 2%) in a 30 μm thick liquid film sandwiched between two glass slides under different magnetic fields: (a) 0 G and 0 G/cm; (b, c) 300 G and 580 G/cm; (d, e) 500 G and 982 G/cm; (f) 1500 G and 2670 G/cm. The field direction is parallel to the viewing angle in (a, b, d, f), but tilted for approximately 15° and 60° away from the viewing angle in (c) and (e), respectively. All scale bars are 20 μm except 50 μm for (e).

Further areas of applicability of the present disclosure will become apparent from the detailed description provided hereinafter. It should be understood that the detailed description and exemplary embodiments are intended for purposes of illustration only. Thus, the detailed description and exemplary embodiments are not intended to necessarily limit the scope of the disclosure.

DETAILED DESCRIPTION

In accordance with an exemplary embodiment, a key in the magnetic assembly strategy is to establish magnetic response for nonmagnetic particles. It is well known that nonmagnetic particles dispersed in magnetized ferrofluid behave as magnetic "holes" with effective magnetic moments μ equal to the total moment of the displaced ferrofluid but in the opposite direction, $\mu=-V_{X_{eff}}H$, where V is the volume of the particles, $X_{eff}$ the effective volume susceptibility of the ferrofluid, H local magnetic field strength. The application of a magnetic field induces a dipole-dipole interaction $F=3\mu^2(1-3\cos^2\theta)/d^4$ between two particles, where θ is the angle between the line connecting the centers of the particles and the direction of the field and d is the center-center distance. The dipole-dipole interaction is attractive along the direction of magnetic field and repulsive perpendicular to the direction of magnetic field, which can drive the self-assembly of the magnetic holes into 1D chains, or form complex superstructures when particles with different effective magnetization relative to the ferrofluid are involved. The gradient of the magnetic field also induces a packing force $F_m=V(\mu B)$, where B is the strength of magnetic field. The packing force drives magnetic particles to move towards regions of maximum magnetic field and nonmagnetic particles towards regions of minimum magnetic field, resulting in concentration gradients in mixed magnetic and nonmagnetic colloid suspensions.

Prior efforts in assembling magnetic holes have been limited to objects with sizes in the micrometer range because those of smaller dimensions do not possess high enough magnetic moment and the Brownian motion significantly interferes their assembly. Increasing the magnetic response of a magnetic hole requires either a stronger external field or a higher concentration of magnetic nanoparticles, both of which can become problematic in practice due to the instability of the ferrofluid under these conditions. As a result, assembly based on magnetic hole effect has been difficult for nonmagnetic particles with size down to a few hundred nanometers, and has rarely been successfully applied to the fabrication of photonic crystals although the concept has been proposed previously. In accordance with an exemplary embodiment, the issue is by using highly surface-charged magnetic nanocrystals to produce ferrofluids that are stable against aggregation at high concentrations (volume fraction of 4%) and under strong and high-gradient magnetic fields. The high stability of the ferrofluids allows the efficient assembly of approximately 185-nm nonmagnetic polymer beads into photonic structures under magnetic fields with a large variation in strength and field gradient. It is found that the interplay of magnetic dipole force and packing force determines the structure evolution of the assemblies from 1D periodic chains to 3D colloidal crystals. In particular, under a strong magnetic field with high field gradient, it is now possible to quickly produce 3D photonic crystals with high reflectance (83%) in the visible range within several minutes, making it a promising method for fast creation of large-area photonic crystals using nonmagnetic particles as building blocks.

In accordance with an exemplary embodiment, water-soluble superparamagnetic magnetite nanocrystals were synthesized using a one-step high-temperature polyol process. Briefly, $Fe_3O_4$ nanocrystals were prepared by hydrolyzing $FeCl_3$ with NaOH at around 220° C. in a diethylene glycol solution with polyacrylic acid as a surfactant. The as-prepared $Fe_3O_4$ nanocrystals with average size of 11.5 nm have high surface charge and superior dispersability in water, making their aqueous solution a good candidate as the ferrofluidic media for magnetic hole assembly. Monodisperse polystyrene (PS) beads with diameter of 185 nm were synthesized through emulsion polymerization of styrene and a small amount of methyl methacrylate (MMA) with sodium styrene sulfonate as the emulsifier. Both magnetite nanocrystals and PS beads were cleaned a few times with ethanol/water and then mixed in aqueous solutions for magnetic assembly.

The self-assembly behavior of the PS beads in the ferrofluid in response to an external magnetic fields was first studied in situ through optical microscopy. A thin liquid film (approximately 30 μm) was formed by sandwiching a drop of mixed $Fe_3O_4$ nanocrystals and PS beads solution between two cover glasses. A vertically movable magnet was placed underneath the horizontal glasses, so that the sample-magnet distance, and, thereby, the field strength can be conveniently controlled. The assembly behavior was then observed from the top of the liquid film using an optical microscope operated in the dark-field mode. FIG. 1 shows the structure evolution under the magnetic field with increasing field strengths. In the absence of the magnetic field, the colloids are well dispersed and the homogeneous solution shows the native brown color of iron oxide (FIG. 1a). Brownian motion makes it difficult to capture a clear image of particles. When a 300 Gauss (G) magnetic field is vertically applied, PS beads instantaneously line up along the field and appear as isolated green spots in the optical dark field (FIG. 1b). The green color results from the diffraction of the PS chains with periodical interparticle distances comparable to the wavelength of visible light. A slight tilt (approximately 30°) of the magnet from the vertical orientation confirms that each spot is actually a chain of particles (FIG. 1c). The color shift from green to blue due to smaller diffraction angle is expected for 1D photonic structures. There chains are kept separated by both electrostatic and magnetic repulsions between them. Similar to the previous case of self-assembly of superparamagnetic colloidal particles, these 1D photonic structures have fast and reversible response to external magnetic fields. When the field strength is increased to 500 G, these chains are gradually evolved into labyrinth-like structures. FIG. 1d shows the mixed state of chains and labyrinths. Careful inspection of the labyrinth structures through tilting the direction of the magnetic field to around 60° indicates that they are in fact plate-like assemblies of PS beads (FIG. 1e). Although it is difficult to observe uniform blue shift of diffraction due to the random orientations of the plate-like assemblies, one can still clearly see the transition from green to blue-violet color when they are tilted away from the initial vertical orientation. After the magnetic field reaches 1500 G, only labyrinth structures can be observed, which do not change significantly upon further increasing the field strength.

The transition from chains to labyrinths is mainly due to two reasons. Firstly, the magnetic moment of the $Fe_3O_4$ nanocrystals and consequently that of the holes (PS beads) are increased under stronger magnetic field. Secondly, the local concentration of PS particles goes up slightly as driven by the stronger packing force due to the increased magnetic field gradient. The inter-chain distance is thus reduced owing to the fact that more chains are formed on the top surface of the liquid film. Both the increased magnetic moment and decreased chain separation cause stronger repulsion between the chains, which eventually results in the aggregation of chains into labyrinth structures to minimize the free energy. The order along the direction of original chains is not significantly disrupted so that the labyrinths still diffract green light and appear very bright in the optical dark field. Interestingly, these labyrinth patterns are similar to those reported by Islam et al., even though their patterns are assemblies of magnetic nanocrystals, not nonmagnetic colloids. In accordance with an exemplary embodiment, no aggregation behavior of magnetic nanocrystals in pure ferrofluid under the optical microscopy was not seen. The high stability of the $Fe_3O_4$ nanocrystals against magnetically induced clusterization can be attributed to their high surface charge in aqueous solution.

Figure 2:
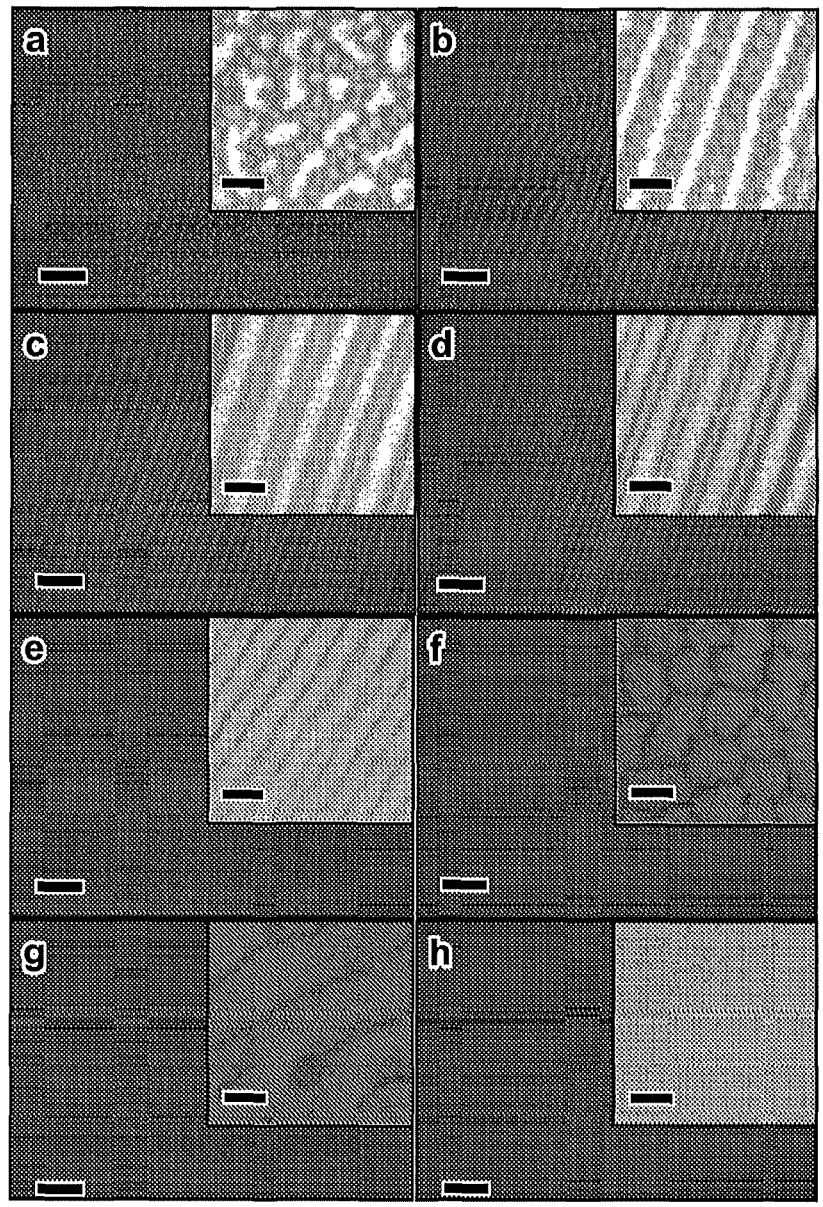
FIG. 2 are optical microscope images showing the structure evolution of assembled 185-nm PS beads dispersed in the ferrofluid under increasing magnetic fields: (a) 1050 G and 1900 G/cm, (b) 1200 G and 2160 G/cm, (c) 1220 G and 2190 G/cm, (d) 1240 G and 2220 G/cm, (e) 1260 G and 2255 G/cm, (f) 1300 G and 2320 G/cm, (g) 1380 G and 2460 G/cm, (h) 1460 G and 2600 G/cm. The volume fractions are both 4% for PS and $Fe_3O_4$. The mixed solution is sealed in a glass cell with thickness of 1 mm. The direction of magnetic field is parallel to the viewing angle. The scale bars are 20 μm. The insets are corresponding enlarged images with adjusted contrast to clearly show the assembled patterns, and the scale bars are 5 μm for all insets.

To further study the concentration gradient effect, the assembly in a liquid film with increased thickness (1 mm) and higher concentration of PS and ferrofluid (both at 4% volume fraction) was observed. Unlike the thin film case, the large amount of PS in the background makes it difficult to image the 1D assemblies when the field strength is low, although their diffraction can be still collectively detected using a spectrometer as shown in later discussions. When the field is enhanced to 1050 G with field gradient of 1900 G/cm, small green and large yellow domains can be observed although the overall contrast is still low. The small green domains are believed to be aggregates of a few chains while the large yellow domains are believed to be lamellar-like structures similar to the patterns resulted from the aggregation of magnetic nanocrystals. The overall reflection of the liquid film decreases as lamellar structures grow larger, suggesting disturbed order along the field direction. As the magnet moves closer to the sample, the large domains can be further assembled into long-range ordered patterns (lamellar chains) with many small green domains sandwiched in between (FIG. 2b). Interestingly, these small green domains can also connect to form continuous long chains upon increasing the field strength and gradient (FIG. 2c). Both the green and yellow chains expand in width when the field gradient is further strengthened (FIG. 2d), after which only yellow lamellar chains exist with a slight increase in the magnetic field gradient (FIG. 2e). The lamellar chains become unstable and break into domains with larger diameters under a field of 1300 G and 2320 G/cm (FIG. 2f). These domains show irregular hexagonal arrangement from the top view, further aggregate into large ribbons (FIG. 2g), and finally connect each other and form a uniform layer of 3D assemblies without showing contrast (FIG. 2h) under even stronger magnetic field (1460 G and 2600 G/cm).

In accordance with an exemplary embodiment, a mass transport model was developed to numerically monitor the concentration distribution at different time (Supporting Information). Although the model is yet to predict the phase change during the assembly because it omits the magnetic dipole interaction, it still clearly demonstrates that nonmagnetic beads dispersed in ferrofluids move towards the top region of the film, where the magnetic field is minimum. Local concentration of polymer beads at the top region keeps increasing until reaching equilibrium, while nonmagnetic beads in other regions are depleted. The time to reach concentration equilibrium depends on the film thickness, ranging from 20 sec for a 30-µm film to several minutes for a 1-mm film. Unlike the case of 30-µm liquid film, a large concentration gradient of PS beads can build up in a 1-mm film upon the application of external fields, thus driving the formation of much richer phases of assemblies.

An important fact during the phase transition is that the free space without PS assemblies are gradually decreased (from FIGS. 2a to 2f), which confirms the increasing local concentration of nonmagnetic beads. The growth of small domains into large lamellar ones is mainly owing to this concentration gradient effect driven by the packing force. The cause of the formation of these regularly arranged lamellar structures over a large area still requires further studies. Apparently, the electrostatic and magnetic repulsions play a role here by keeping the lamellar chains away from each other. This long-range order might reduce the dipole interaction energy and make the system more stable when the local concentration of beads is in an appropriate range.

Figure 3:
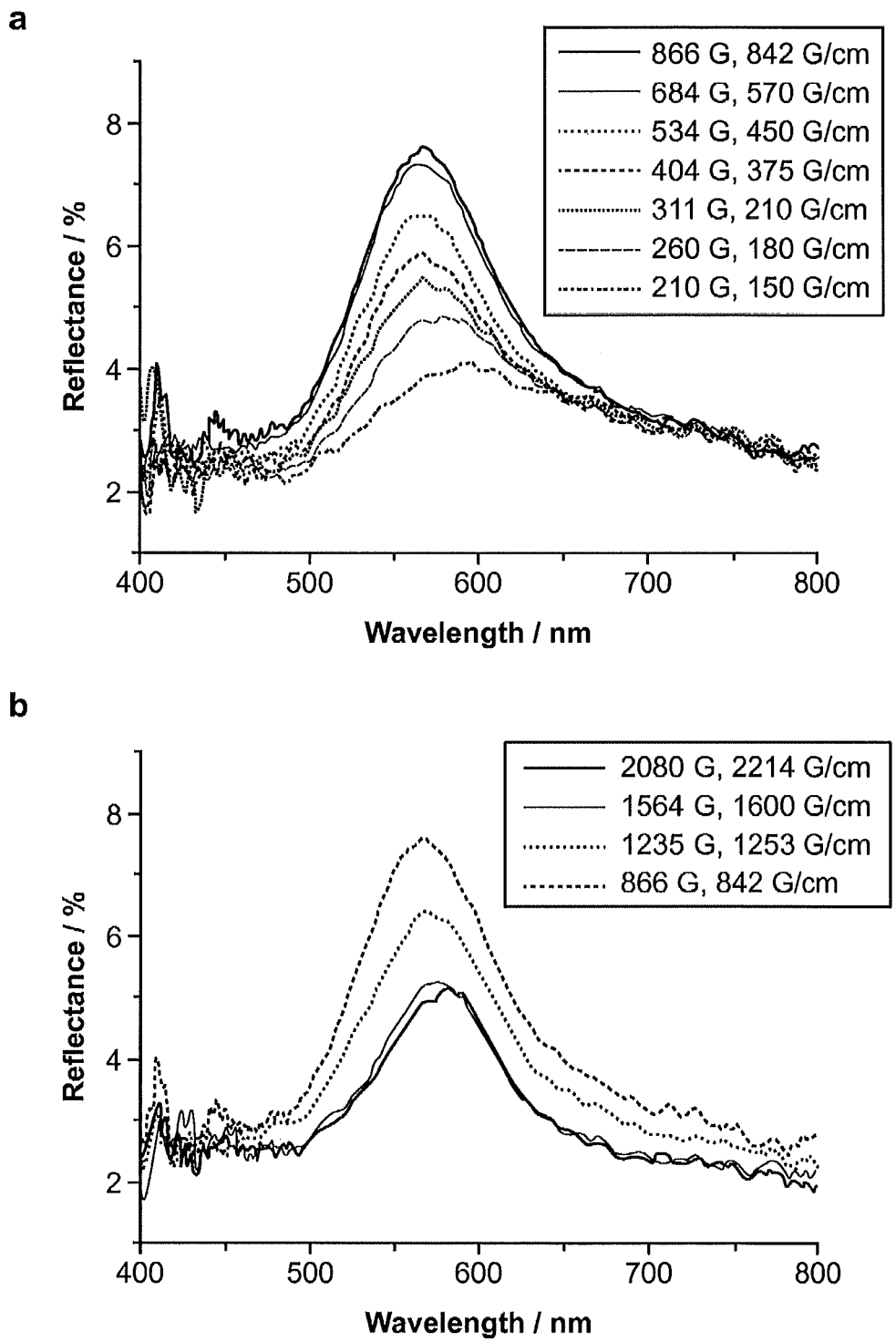
FIG. 3 is reflection spectra of the 1 mm thick film of mixed PS beads and ferrofluid solution in response to an external magnetic field with varying strengths. The volume fractions are 4% for both PS and $Fe_3O_4$.

The ordering of PS beads leads to optical diffraction, which can be measured by recording the reflectance using a spectrophotometer. FIG. 3 shows the reflectance spectra of the 1-mm film of the PS/ferrofluid mixture in response to a varying magnetic field achieved by controlling the magnet-sample distance (L). Under weak magnetic fields, the diffraction is mainly contributed by the 1D chain-like assemblies. As shown in FIG. 3a, a diffraction peak appears at 595 nm in a field of 210 G, blue shifts to 578 nm at 260 G and to 567 nm at 311 G with gradual enhancement in intensity, as expected by the increased magnetic moment of PS beads and thereby stronger interparticle attraction and higher degree of order. Further enhancing the field to 866 G does not significantly change the peak position, but only increases the peak intensity. This is very similar to the previous case of magnetic 1D assembly of $Fe_3O_4@SiO_2$ colloids in ethanol, where the diffraction does not shift in an enhancing field when the interparticle separation cannot be changed anymore. Beyond 866 G, the magnetic packing force becomes significant and causes the aggregation of chains, forming larger domains of assemblies with slight red-shift in diffraction (FIG. 3b). In consistent with the observation in optical microscopy, the aggregation of 1D chains into larger assemblies disturbs the original ordering along the field direction, thus leads to the decreased diffraction intensity.

Figure 4:
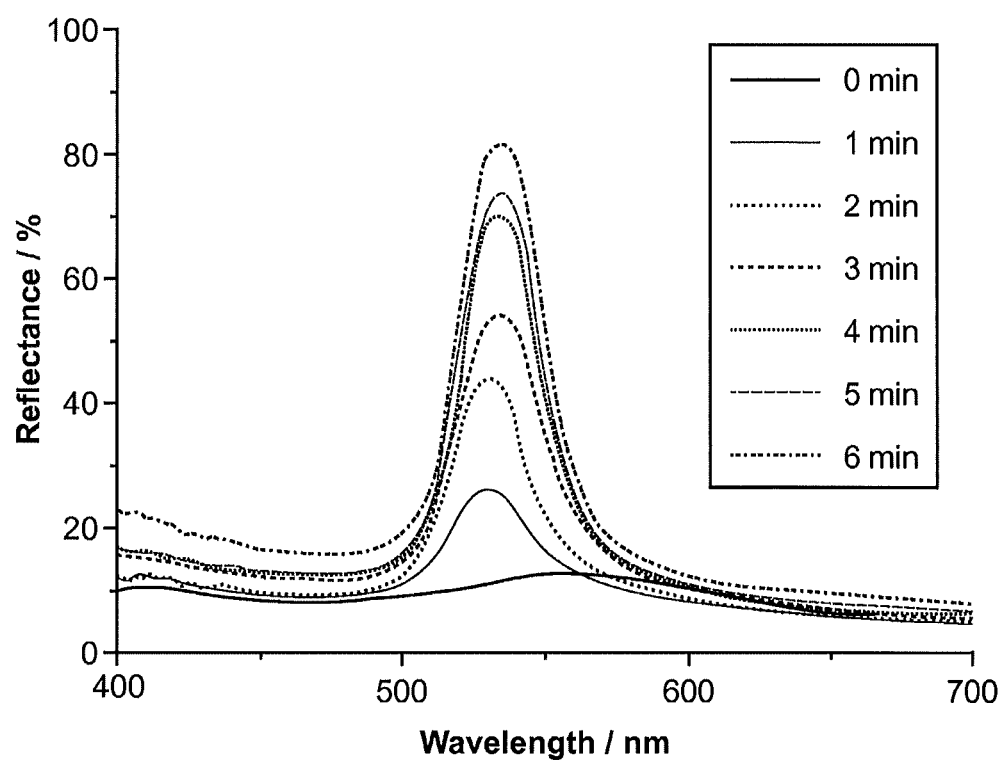
FIG. 4 is a time-dependent reflection spectra of the 1 mm thick film of mixed PS and ferrofluid solution in response to a fixed magnetic field of 2530 G with gradient of 2500 G/cm. The volume fractions are 4% for both PS and $Fe_3O_4$.

Compared with the solid magnetite colloids studied in previous reports, the magnetic moment of PS spheres is relatively low. In magnetic fields with low strength and gradient, the reflectance of the assemblies is typically below 10%, which is due to both low degree of order and the strong absorption of the ferrofluid. In a strong magnetic field with high gradient, the strong packing force results in a substantial concentration gradient effect, which eventually leads to the formation of 3D assemblies as observed in optical microscopic studies. Interestingly, the long-range order of such 3D structures can improve significantly over time if the magnetic field is maintained. As shown in FIG. 4, upon applying a magnetic field of 2530 G with gradient of 2500 G/cm, a weak diffraction peak at 563 nm appears immediately due to the chaining of the PS particles. After 1 min, the peak position moves to 533 nm and the intensity increases to 25%, indicating the structure evolution from 1D chains to 3D domains during which the lattice constant decreases. In the next 5 min, the peak position slightly red shifts while the intensity gradually increases and eventually reaches the maximum of approximately 83%, suggesting the formation of high quality 3D colloidal crystals. The enhancement of diffraction intensity can be attributed to the increase in the density of PS spheres, overall thickness of the film, and the enhanced long-range order of the 3D assemblies as the local concentration of PS spheres increases. The slight red-shift during this period might result from the increased average refractive index as the volume fraction of PS spheres increases.

Figure 5:
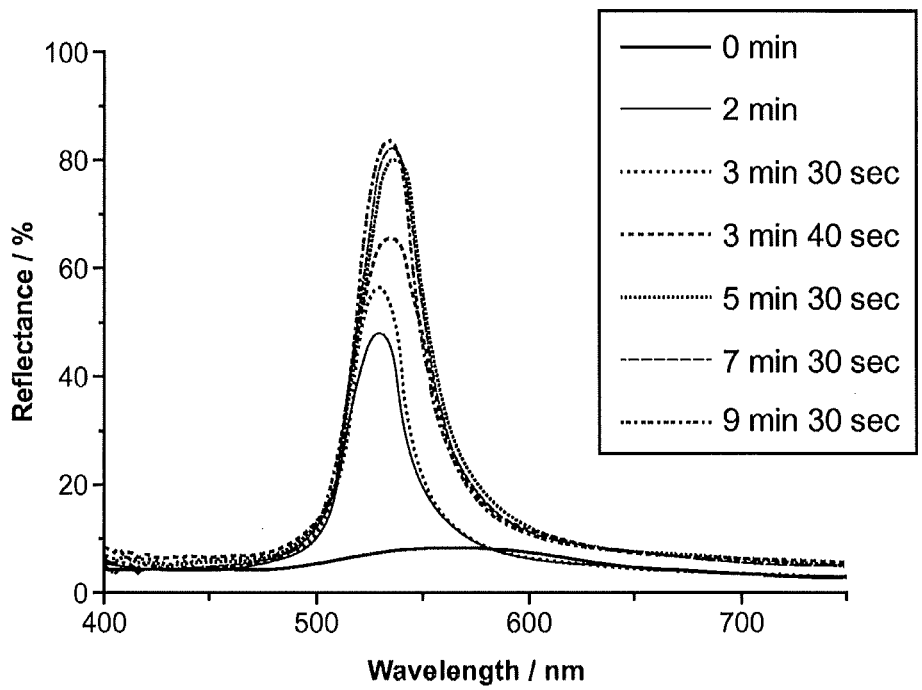
FIG. 5 is a time-dependent reflection spectra of the 1 mm thick liquid film of mixed PS and ferrofluid solution in response to a magnetic field of 2530 G with gradient of 2500 G/cm. The magnetic field was removed at 3 min 30 sec. The volume fractions are 4% for both PS and $Fe_3O_4$.
Figure 5:
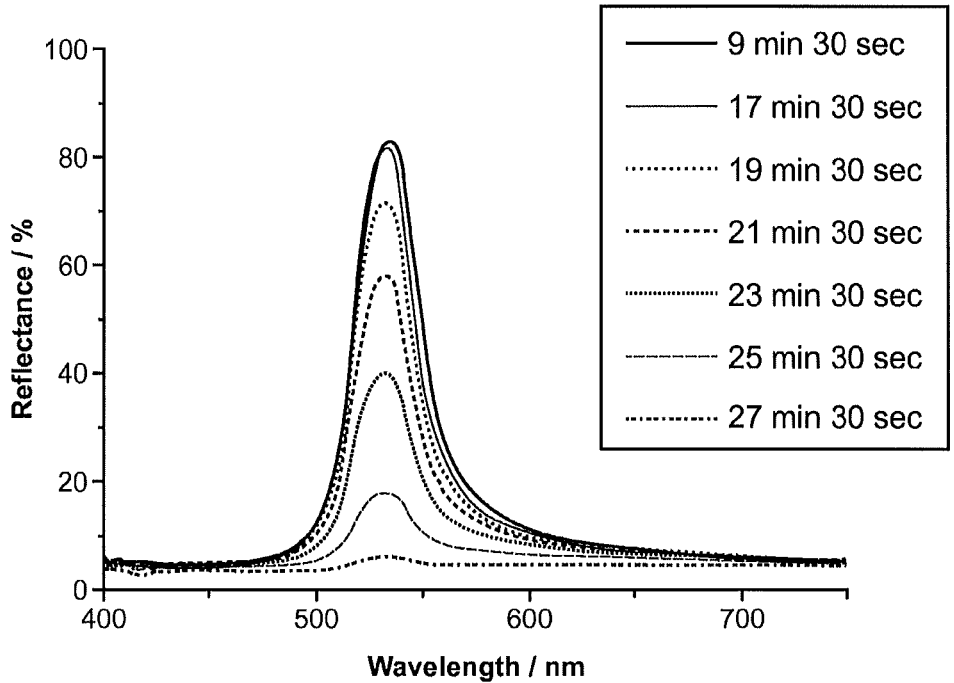

To better understand the assembly process under a strong magnetic field, the magnet was removed at 3 min 30 sec when the diffraction intensity reached over 50% and the diffraction spectra were recorded (FIG. 5). Interestingly, in accordance with an exemplary embodiment, the intensity continued to increase to 62% at 3 min 40 sec, and reached approximately 80% at 5 min 30 sec and the maximum of 83% at 9 min 30 second (FIG. 5a). In the absence of an external field, the maximum reflectance can be maintained for approximately 8 min before starting to slowly drop. If the magnetic field is removed before 50% reflectance is obtained, the diffraction intensity would not increase but decrease immediately after removing the magnetic field. These observations suggest that the assembly process may be divided into two steps. The first step involves the increase of local PS concentration due to the high magnetic field gradient. The movement of magnetic and nonmagnetic particles determines the duration of this step, which is in the range of a few minutes. The concentration of PS beads increases dramatically upon applying the magnetic field so that they eventually assemble into 3D structures near the top side of the cell (the side away from the magnet). Again, a quick transition from 1D chains to 3D domains occurs at the initial stage of this step, as suggested in FIG. 5a by the apparent blue-shift in the diffraction peak position. The second step is the repositioning of PS beads inside the 3D assemblies into more ordered arrangement as driven by the electrostatic interaction among the PS beads, thus further enhances the diffraction intensity. This step occurs relatively slower so that the diffraction intensity can still increase even after the magnetic field is removed. However, if the external filed is only applied for a short period of time, the dense PS layer is not thick enough and will quickly disassemble upon removal of the external field. When the external field is always present, the PS beads experience the magnetic packing force, which leads to slightly shorter interparticle distance (along the field direction) than that without the magnetic field. This explains the small difference of peak position at maximum intensity in FIGS. 4 and 5. The "compression" effect by the magnetic field can also be observed in FIG. 5a, where a distinctive red-shift occurred in the diffraction peak immediately after the magnetic field was removed. The disassembly of the 3D crystal is a slow process and proceeds from the bottom side. As shown in FIG. 5b, after remaining at the maximum value for approximately 8 minutes, the diffraction intensity of the colloidal crystal gradually dropped and eventually disappeared after an additional 10 minutes. This disassembly process is not entirely the opposite operation of the assembly process, for example, the initial peak at 563 nm due to the 1D chains formed during the assembly process (FIG. 5a) cannot be observed during the disassembly process (FIG. 5b).

In accordance with an exemplary embodiment, it is worth noting that both $Fe_3O_4$ nanocrystals and PS beads have highly negative surface charge and the possibility of adsorption of $Fe_3O_4$ on PS beads to change the sign of their magnetostatic energy was ignored. The strong repulsive force resulted from highly charged surfaces provides the stability of both magnetic and nonmagnetic particles in the system. The stability of ferrofluid is crucial for manipulating the nonmagnetic particles while the high surface charge on PS beads contributes to the formation of high quality photonic crystals. Intentional addition of salts to the mixed solution causes the aggregation of particles even in the absence of the external magnetic field, and therefore colloidal crystals cannot be obtained. As indicated before, the structure evolution results from the interplay of dipole force and packing force of the magnetic holes in ferrofluids. In a low magnetic field (also low field gradient), the ferrofluid can be treated as homogeneous and the dipole force dominates the assembly of PS beads and results in the formation of chain-like structures. In a high magnetic field (also with high field gradient), the packing force becomes dominant which creates a significant concentration gradient of PS beads and leads to their assembly into high quality 3D crystals.

Figure 6:
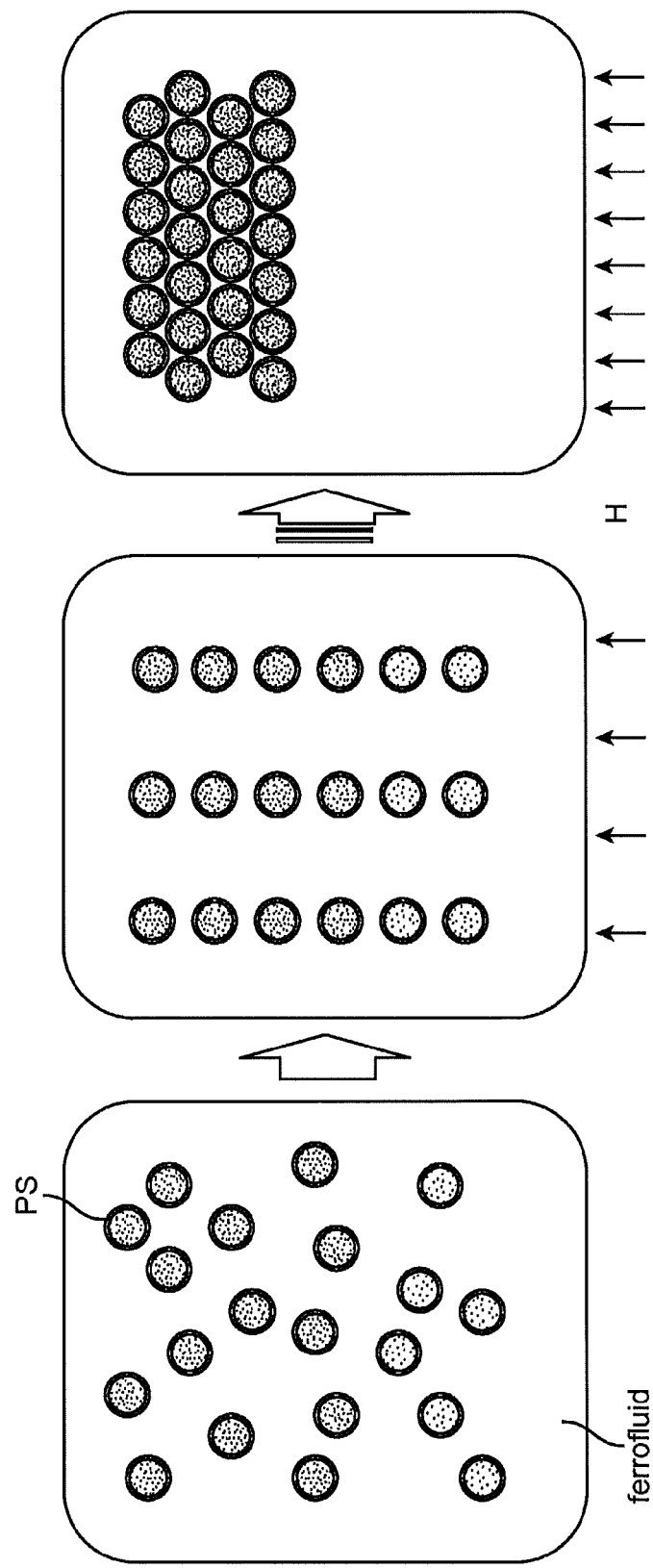
FIG. 6 is a schematic diagram showing a method of forming colloidal photonic crystal structures, which diffracts light to create color.

FIG. 6 is a schematic diagram showing a method of forming colloidal photonic crystal structures, which diffracts light to create color. As shown in FIG. 6, a plurality of nonmagnetic particles (PS) is dispersed within a magnetic liquid media. In accordance with an exemplary embodiment, the magnetic liquid media is a magnetic nanoparticle-based ferrofluid, and more preferably the nanoparticle-based ferrofluid is prepared by dispersing magnetic nanoparticles of transition metal and metal oxides (such as $Fe_3O_4$, $\gamma$-$Fe_2O_3$, $Co_3O_4$, Ni, Co, Fe, etc.) nanoparticles in a liquid medium. A magnetic force is applied to the dispersion of nonmagnetic particles and magnetic liquid media to form a labyrinth-like structure within the dispersion of non-magnetic particles and magnetic liquid media. In accordance with an exemplary embodiment, the ferrofluid remains a stable dispersion when exposed to external magnetic fields. The ferrofluid is preferably comprised of highly charged nanoparticles where the nanoparticles are charged such that the desired dispersion is achieved. For instance, in the case of ferrofluids created in polar solvents the zeta potential of highly charged nanoparticles is 50 mv measured at ambient conditions.

In summary, a general magnetic assembly strategy based on magnetic hole effect has been developed to fabricate photonic crystals using nonmagnetic particles as building blocks. By tuning the magnetic field, it is possible to control the photonic structures from 1D particle chains to 3D colloidal crystals. The chain-like 1D photonic structures form in a weak magnetic field and show fast and reversible response to external magnetic fields. Increasing the strength and gradient of the magnetic field induces the evolution from 1D to 3D structures, which involves complex phase changes and disrupts the photonic property. In a strong magnetic field with large field gradient, high quality 3D photonic structures with reflectance up to 83% can be produced in several minutes, which is very efficient comparing to other colloidal assembly methods. It is believed that this fabrication method can be easily scaled up using large area magnetic fields and extended to the assembly of building blocks with different compositions and morphologies. As an alternative to conventional methods, this new approach allows fast creation of high quality photonic crystal structures, thus providing a new platform for the fabrication of novel optical components for many practical applications.

The previous description of the various embodiments is provided to enable any person skilled in the art to make or use the invention recited in the accompanying claims of the disclosed system. While various exemplary embodiments of the disclosed system have been described above, it should be understood that they have been presented by way of example only, and not limitation. While exemplary embodiments of the disclosed system have been particularly shown and described with reference to embodiments thereof, it will be understood by those skilled in the art that many variations, modifications and alternative configurations may be made to the invention without departing from the spirit and scope of exemplary embodiments of the disclosed system.

Where methods described above indicate certain events occurring in certain order, the ordering of certain events may be modified. Moreover, while a method or process depicted as a flowchart, block diagram, etc., may describe the operations of the method or system in a sequential manner, it should be understood that many of the system's operations can occur concurrently.

Thus, the breadth and scope of exemplary embodiments of the disclosed system should not be limited by any of the above-described embodiments but should be defined only in accordance with the following claims and their equivalents.

What is claimed is:

1. A method of forming colloidal photonic crystal structures, which diffract light to create color comprising:
    synthesizing a magnetic liquid media, the magnetic liquid media comprising water-soluble superparamagnetic magnetite nanocrystals;
    dispersing solid particles within the magnetic liquid media;
    magnetically organizing the solid particles within the magnetic liquid media into colloidal photonic crystal structures that diffract visible light; and
    wherein the synthesizing of the magnetic liquid media comprises a polyol process, wherein the magnetic liquid media includes $Fe_3O_4$ nanocrystals prepared by hydrolyzing $FeCl_3$ with NaOH in a diethylene glycol solution with polyacrylic acid as a surfactant and an aqueous solution.

2. The method of claim 1, wherein the solid particles are nonmagnetic.

3. The method of claim 2, wherein the nonmagnetic particles are solid beads composed of polymer, inorganic materials, or their composites.

4. The method of claim 2, wherein the nonmagnetic particles are uniform polystyrene (PS) or poly(methyl methacrylate) (PMMA) beads.

5. The method of claim 2, wherein the nonmagnetic particles are uniform silica or titania beads.

6. The method of claim 2, wherein the colloidal photonic crystal structures are formed having from 1 D (one-dimensional) chains to 3D (three-dimensional) assemblies based on the interplay of magnetically induced dipole force and packing force.

7. The method of claim 1, further comprising:
    applying a magnetic force to the dispersion of nonmagnetic particles and magnetic liquid media to form labyrinth structure within the dispersion of the nonmagnetic particles and the magnetic liquid media.

8. The method of claim 1, wherein the superparamagnetic magnetite nanocrystals comprises about 2 percent by volume fraction of the magnetic liquid media, and the superparamagnetic magnetite nanocrystals have an average size of about 11.5 nm and the solid particles have a diameter of about 185 nm.

9. The method of claim 1, wherein the solid particles comprise about 3 percent by volume fraction of a solution of the solid particles and the magnetic liquid media.

10. The structures method of claim 1, wherein the superparamagnetic magnetite nanocrystals have an average size of about 11.5 nm and the solid particles have a diameter of about 185 nm.

11. The method of claim 1, wherein the superparamagnetic magnetite nanocrystals comprises about 4 percent by volume fraction of the magnetic liquid media, and the superparamagnetic magnetite nanocrystals have an average size of about 11.5 nm and the solid particles have a diameter of about 185 nm.

12. The method of claim 1, wherein the solid particles comprise about 4 percent by volume fraction of a solution of the solid particles and the magnetic liquid media.

13. Colloidal photonic crystal structures, which diffract light to create color, the structures comprising:
    a magnetic liquid media having solid particles dispersed therein, the magnetic liquid media comprising superparamagnetic magnetite nanocrystals synthesize by a polyol process wherein the magnetic liquid media includes $Fe_3O_4$ nanocrystals prepared by hydrolyzing $FeCl_3$ with NaOH in a diethylene glycol solution with polyacrylic acid as a surfactant and an aqueous solution; and
    wherein the solid particles are magnetically organized within the magnetic liquid media into colloidal photonic crystal structures that diffract light.

14. The structures of claim 13, wherein the solid particles are nonmagnetic.

15. The structures of claim 14, wherein the nonmagnetic particles are solid beads composed of polymer, inorganic materials, or their composites.

16. The structures of claim 14, wherein the nonmagnetic particles are uniform polystyrene (PS) or poly(methyl methacrylate) (PMMA) beads.

17. The structures of claim 14, wherein the nonmagnetic particles are uniform silica or titania beads.

18. The structures of claim 13, wherein the colloidal photonic crystal structures are formed having from 1 D (one-dimensional) chains to 3D (three-dimensional) assemblies based on the interplay of magnetically induced dipole force and packing force.

19. The structures of claim 13, whereby applying a magnetic force to the dispersion of nonmagnetic particles and magnetic liquid media labyrinth structure is formed within the dispersion of nonmagnetic particles and the magnetic liquid media.

20. The structures of claim 13, wherein the superparamagnetic magnetite nanocrystals comprises about 2 percent by volume fraction of the magnetic liquid media.

21. The structures of claim 13, wherein the superparamagnetic magnetite nanocrystals comprises about 4 percent by volume fraction of the magnetic liquid media.

22. The structures of claim 13, wherein the solid particles comprise about 3 percent by volume fraction of a solution of the solid particles and the magnetic liquid media.

23. The structures of claim 13, wherein the solid particles comprise about 4 percent by volume fraction of a solution of the solid particles and the magnetic liquid media.

\* \* \* \* \*